(12) United States Patent
Pavlic (10) Patent No.: US 9,384,401 B2
(45) Date of Patent: Jul. 5, 2016

(54) METHOD FOR FOG DETECTION

(71) Applicant: Bayerische Motoren Werke Aktiengesellschaft, Munich (DE)

(72) Inventor: Mario Pavlic, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 96 days.

(21) Appl. No.: 14/278,792

(22) Filed: May 15, 2014

(65) Prior Publication Data

US 2014/0247968 A1    Sep. 4, 2014

Related U.S. Application Data

(63) Continuation of application No. PCT/EP2012/072024, filed on Nov. 7, 2012.

(30) Foreign Application Priority Data

Nov. 16, 2011   (DE) .......................... 10 2011 086 512

(51) Int. Cl.
  *G06K 9/00*     (2006.01)
  *G06K 9/62*     (2006.01)
  *G06K 9/66*     (2006.01)
  (Continued)

(52) U.S. Cl.
  CPC .......... *G06K 9/00791* (2013.01); *G06K 9/6267* (2013.01); *G06K 9/66* (2013.01); *G06T 7/408* (2013.01); *G06T 2207/10004* (2013.01); *G06T 2207/10016* (2013.01); *G06T 2207/10024* (2013.01); *G06T 2207/20024* (2013.01); *G06T 2207/20056* (2013.01); *G06T 2207/20081* (2013.01); *G06T 2207/30252* (2013.01)

(58) Field of Classification Search
  None
  See application file for complete search history.

(56) References Cited

U.S. PATENT DOCUMENTS

| | | | | |
|---|---|---|---|---|
| 7,505,604 B2 * | 3/2009 | Zakrzewski | ....... | B64D 45/0015 382/100 |
| 8,077,921 B2 | 12/2011 | Kawasaki | | |
| 2008/0170754 A1 * | 7/2008 | Kawasaki | .......... | G06K 9/00825 382/104 |

FOREIGN PATENT DOCUMENTS

| | | |
|---|---|---|
| DE | 10 2008 003 948 A1 | 7/2008 |
| FR | 2 835 911 B1 | 5/2004 |

(Continued)

OTHER PUBLICATIONS

Pavlic, Classification of Images in Fog and Fog-Free Scenes for Use in Vehicles, 2013.*

(Continued)

*Primary Examiner* — Siamak Harandi
*Assistant Examiner* — Pinalben Patel
(74) *Attorney, Agent, or Firm* — Crowell & Moring LLP (57) ABSTRACT

A method for detecting fog by use of a camera image or a video image includes the taking of a two-dimensional image with at least one color channel or several color channels as a function of two independent location coordinates. The method determines a two-dimensional gray-scale function for the at least one color channel or for each of the several color channels, which defines the value of the gray scale as a function of the two independent location coordinates of the two-dimensional image. Then, the method performs a two-dimensional Fourier transformation of the two-dimensional gray-scale function depending on two independent frequency coordinates.

7 Claims, 5 Drawing Sheets

(51) Int. Cl.
  *G06T 7/40* (2006.01)
  *G06T 7/00* (2006.01)

(56) References Cited

FOREIGN PATENT DOCUMENTS

JP  2006-221467 A    8/2006
JP   2006221467 A *  8/2006

OTHER PUBLICATIONS

Pavlic, Image based fog detection in vehicles, BMW Group, Traffic Technology and Traffic Management, Munich, Germany.*
Hollowell, Automated Extraction of Weather Variables from Camera Imagery, MIT Lincoln Laboratory, 2005.*
Derpanis, Gabor filters, York University, 2007.*
Movellan, Tutorial on Gabor Filters, technical report, MPLab Tutorials, Univ. of California, San Diego, 2005.*
Sun, On-Road Vehicle Detection Using Gabor Filters and Support Vector Machines, Ford Motor Company, Dearborn, MI, 2002.*
Hautière, Nicolas et al., "Automatic fog detection and estimation of visibility distance through use of an onboard camera," Machine Vision and Applications, Jan. 27, 2006, pp. 8-20, vol. 17, Issue 1, Springer-Verlag.
Hautière, Nicolas et al., "Perception through Scattering Media for Autonomous Vehicles," Autonomous Robots Research Advances, 2008, pp. 223-267, Nova Science Publishers, Inc.
Bronte, S. et al., "Fog Detection System Based on Computer Vision Techniques," Intelligent Transportation Systems, 2009, pp. 30-35, 12th International IEEE Conference on Intelligent Transportation Systems, St. Louis, MO, USA.
Roser, Martin, et al., "Classification of Weather Situations on Single Color Images," Intelligent Vehicles Symposium, 2008, pp. 798-803, IEEE.
International Search Report dated Apr. 2, 2013 with English translation (5 pages).
German-language Search Report dated Jul. 11, 2012 with partial English translation (10 pages).

* cited by examiner

METHOD FOR FOG DETECTION

CROSS REFERENCE TO RELATED APPLICATIONS

This application is a continuation of PCT International Application No. PCT/EP2012/072024, filed Nov. 7, 2012, which claims priority under 35 U.S.C. §119 from German Patent Application No. 10 2011 086 512.8, filed Nov. 16, 2011, the entire disclosures of which are herein expressly incorporated by reference.

BACKGROUND AND SUMMARY OF THE INVENTION

The invention relates to a method for the detection of fog by use of a camera image or a video image.

The occurrence of fog represents a significant impairment of the movement of goods and persons on the ground, in the air and at sea. Modern vehicles can therefore be equipped with automated video-based fog detection systems which may be coupled with different driver assistance systems.

For example, in N. Hautiere et al. "Automatic Fog Detection and Estimation of Visibility Distance through Use of an Onboard Camera", *Machine Vision and Applications*, Vol. 17, No. 1, pp. 8-20, January 2006, an approach is described for the video-based fog detection and visibility distance estimation in a vehicle during daytime, which is also the object of French Patent Document FR 2835911 B. In this case, an image is processed which was taken by a front camera. By means of a region-growing approach, an image area is extracted which contains parts of the road as well as parts of the sky. Within this area, a measuring range is defined which contains the median of the intensity values for every image line. The (intensity) course from the lowermost to the uppermost image line of this measuring range is called an intensity function. The turning point of the intensity function defines a visibility distance, i.e. the image line above which objects are no longer perceptible to the driver. The turning point of the intensity function is defined by the image line above which the driver can no longer recognize any objects. By way of the perspective projection and assuming that a topography is flat, a corresponding visibility distance in meters can be inferred for this image line. When the image line having the turning point is situated above the image center point, a visibility distance of infinite is obtained, whereby, by means of this process, the presence of fog can also be recognized.

However, in "Perception through Scattering Media for Autonomous Vehicles", *Autonomous Robots Research Advances*, Nova Science Publishers, pp. 223-267, April 2008, Hautiere et al. themselves determined that the originally used region-growing approach for the extraction of the image region to be investigated, which contains parts of the road as well as parts of the sky, supplies insufficient results in many traffic situations. It cannot always be guaranteed that the horizon is present in the form of a transition from the road to the sky, as, for example, in the case of traffic driving ahead or in the case of certain landscape-related circumstances.

An alternative approach is the topic of Bronte et al. in "Fog Detection System Based on Computer Vision Techniques", *IEEE Intelligent Transportation Systems*, pp. 1-6, October 2009, with a system for the detection of fog and for the estimation of the visibility distances. In this case, two adjoining regions—a road area and a sky area—are extracted in a camera image by way of a region-growing algorithm. Furthermore, the actual vanishing point is calculated by way of image characteristics. In the case of a fog scene, the sky area, measured from the uppermost image line, is higher than the vanishing point. By way of the image line, in which the two regions touch one another, the visibility distance can be determined by way of the perspective projection and the assumption of a flat topography. In order to avoid faulty detections, the algorithm is additionally preceded by a threshold-value-based "no-fog detector". The latter detects, by means of the sum of the occurring gradient amounts within the upper image half whether the image is sufficiently blurred in order to carry out an estimation of the visibility distance. Since the estimation of the visibility distance based on a single image is very unreliable, i.e. with respect to time, is subjected to strong fluctuations over several successive images, a median formation is implemented over a fixed time period.

It is an object of the invention to describe an improved method for the detection of fog by use of a camera image or a video image.

This and other objects are achieved by a method for the detection of fog by use of a camera image or a video, the method comprising the steps of: (a) taking a two-dimensional image with at least one color channel or several color channels as a function of two independent location coordinates, (b) determining a two-dimensional gray-scale function for the at least one color channel or for each of the several color channels, which defines the value of the gray scale as a function of the two independent location coordinates of the two-dimensional image, and (c) two-dimensional Fourier transforming of the two-dimensional gray-scale function depending on two independent frequency coordinates.

The method according to the invention comprises the following steps.

First, a two-dimensional image is taken with at least one color channel or several color channels, and a gray-scale image is created for each of the several color channels. The value of the gray stage image is a function of two independent location coordinates as a two-dimensional gray-scale function.

Subsequently, the gray-scale function is two-dimensionally Fourier-transformed, the Fourier transform being a function of two independent frequency coordinates in the frequency domain.

In the case of this method, the circumstance is utilized that, when taking a gray-scale image of a scene in fog, the intensity differences or gray-scale value gradients of neighboring points will be smaller as the fog becomes increasingly dense than when taking a gray-scale image of the same scenery without any fog. In the image without any fog, sharper edges and higher contrasts can be clearly recognized than in the case of the setting with fog. For example, a white road marking on an asphalt surface becomes indistinct in fog, whereas it can be recognized in a sharply contoured shape in sunshine.

A Fourier transformation of, for example, a one-dimensional step function in the frequency domain supplies different contributions also at high frequencies of zero, which disappear, for example, in the case of the Fourier analysis of a one-dimensional Gaussian distribution curve.

The Fourier transformation therefore has the advantage that the "degree" of the occurrence of fog is scaled in the frequency domain: In the case of fog, the amount of the Fourier transform is concentrated about the zero point of the frequency coordinates; in sunshine, the Fourier transformation increasingly supplies contributions at values of the two frequency coordinates whose amounts are high. The method according to the invention is therefore particularly advantageous for detecting fog by use of camera or video still images.

An image in a black-white representation is based on a single color channel. In contrast, an image in color is normally based on three color channels—a red channel, a green channel and a blue channel. An intensity distribution is assigned to each channel of the image, which intensity distribution can be shown as a gray-scale image.

According to a preferred variant of the method, the two-dimensional gray-scale image is scaled.

A scaling of the gray-scale image has the advantage that local image regions, if possible, are equalized, for example, by illumination and lighting effects. The scaling can be achieved by suitable filters, such as isotropic high-pass and low-pass filters. The scaling prevents the dominance of some image regions in the power spectrum. As an example, cast shadows on a surface that is homogeneous per se can be mentioned whose influence can be reduced by the scaling.

Furthermore, the square of the absolute value of the Fourier transform is calculated, which is called the power spectrum. In the two-dimensional frequency domain, a digital image processing is carried out at the power spectrum.

According to a preferred embodiment of the invention, the power spectrum is analyzed by using a family of Gabor filters. In this case the power spectrum is filtered by means of each individual Gabor filter of the family of Gabor filters over the two-dimensional frequency domain and the result of the filtering is called a Gabor characteristic.

The power spectrum is "scanned" by use of a point-symmetrical family of Gabor filters in the two-dimensional frequency domain. This means that the image set of the power spectrum is also used as the image set for the family of Gabor filters. Each individual Gabor filter, whose image area and whose value area in the frequency domain is defined by its scaling and orientation, is folded with the power spectrum. The folding value is called a Gabor characteristic. In this manner, a Gabor characteristic is assigned to each Gabor filter, and the contribution of the power spectrum in various frequency ranges of the frequency domain is made quantitatively measurable.

In addition, the Gabor characteristics are multiplied by a predefined weighting function in order to calculate a fog indicator. The fog indicator is compared with a specified threshold value. As a result of the comparison, a specified value for "fog" or another specified value for "no-fog" is assigned to a binary variable with a confidence measurement. This means that the process provides the information "fog" or "no-fog" with a confidence measurement.

In addition, it is advantageous for the specified weighting function and the specified threshold value to be determined by way of empirical learning data.

This indicates that, during the development, i.e. before being applied to the intended use, the process is empirically validated by use of learning and training data. For this purpose, by use of test images with visibility distance estimation, an objectivized fog classification of the taken images can be carried out in order to evaluate the process by use of these data.

According to an alternative variant of the present invention, by use of Gabor characteristics, a reduction of characteristics can be carried out with a main component analysis. The reduced characteristics are called main Gabor characteristics.

A main component analysis has the advantage that the Gabor characteristics can be statistically examined for their relevance by means of training data. This permits a resource-saving management of computing power when the process is used as intended.

According to a further variant of the present invention, the power spectrum can be subjected to a reduction of characteristics with a main component analysis. The reduced characteristics are called main characteristics.

In the case of the digital image processing process of the component analysis, each pixel value of the power spectrum in the frequency domain is considered to be an individual characteristic. On the basis of these characteristics, a reduction of characteristics can be carried out by the main component analysis. As an alternative, a support vector process can be used in the frequency domain.

According to a further embodiment of the invention, the Gabor characteristics or the main Gabor characteristics are classified. The classification is carried out by a linear classifier or a non-linear classifier. During the classification, a value and a confidence measurement are assigned to the classification variable which correlates with the occurrence and, optionally, additionally the density of fog.

Here, the linear discriminant analysis or the support vector process, for example, known to the person skilled in the art for digital image processing, can be used. Finally, the classification process outputs a class affiliation, such as "fog" or "no fog" as information. This class affiliation may also be provided with a confidence measurement.

It is particularly advantageous that, in a vehicle, which includes a control unit, a camera system or video system and at least one driver assistance system, the method for the detection of fog is carried out by the camera or video system and by the control unit in real-time, and the class affiliation is transmitted to the at least one driver assistance system. The driver assistance system of the vehicle can output a warning to the driver in case of "fog". As an alternative or in addition, the driver assistance system can be operated in a configuration specified for "fog". A direct contribution can thereby be made to active safety in road traffic.

In this context, real-time means that the information of the class affiliation can be determined by way of the process within a time window which is shorter with respect to time than the inverse image-taking frequency of the gray-scale images of the camera or video system.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
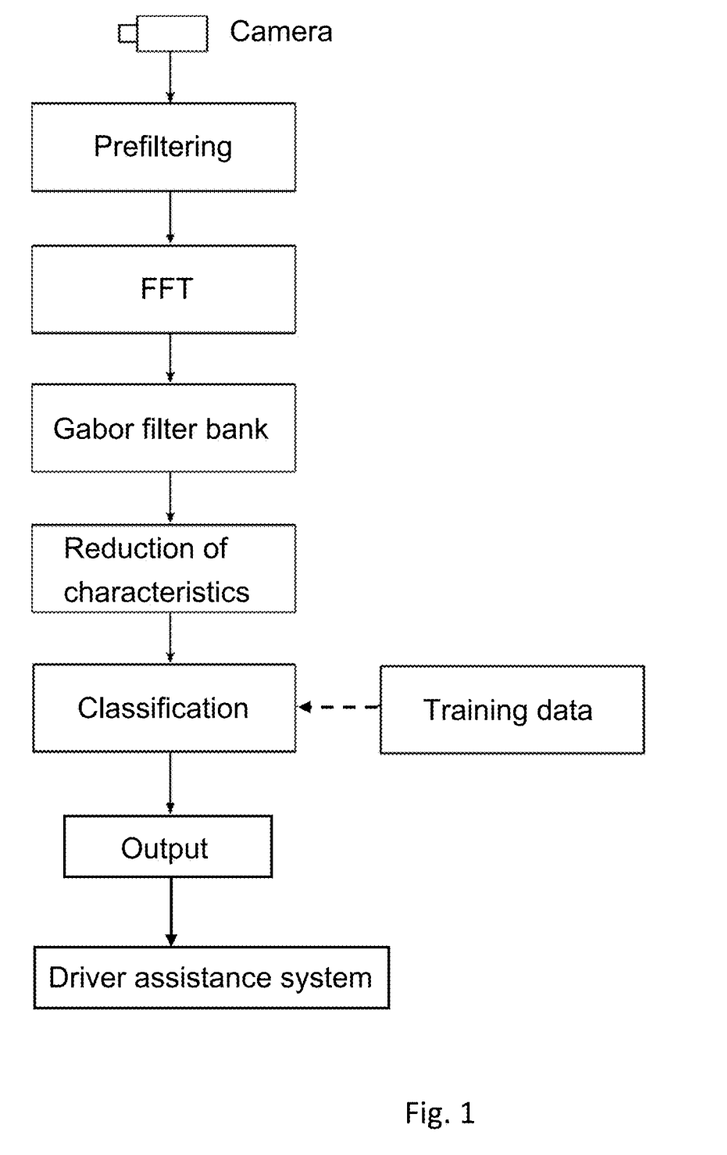
FIG. 1 is a schematic flow diagram of the method for the detection of fog.

FIG. 1 illustrates individual method steps of a method for the detection of fog in a vehicle. The vehicle has a camera system and/or video system, which is mounted, for example, in the area of the driver's rearview mirror in the driving direction of the vehicle. For the detection of fog, a camera- or video-based approach is well-suited because the human perception in the vehicle can thereby be simulated very well. Thus, according to the prior art, cameras are frequently situated in the vehicle, which are mounted in the area of the rearview mirror in the driving direction in order, if possible, to detect a driving situation in the same manner as experienced by the driver. The camera- and/or video system has a data interface to a control unit of the vehicle. The vehicle further includes several driver assistance systems, such as a warning system, which informs the driver of an existing speed limit, or a switching assistant for the automatic on/off-switching of the fog light or the fog taillight. The driver assistance systems also have a data interface to the control unit.

In a first step for the detection of fog by use of a camera- or video system, an image is taken of the outside environment of the vehicle. Ideally, the image acquires the oncoming traffic situation approaching the vehicle during the drive. The image is acquired as a two-dimensional gray-scale image as a function of two independent location coordinates x and y. Without limiting the generality, a black-white image with a color channel is used as the basis. In this case, the gray-scale value is indicated as i(x,y). The gray-scale image may additionally be a square detail of the taken camera image, so that the number of pixels with respect to the image width and the image height of the gray-scale image is the same in each case.

Figure 2A:
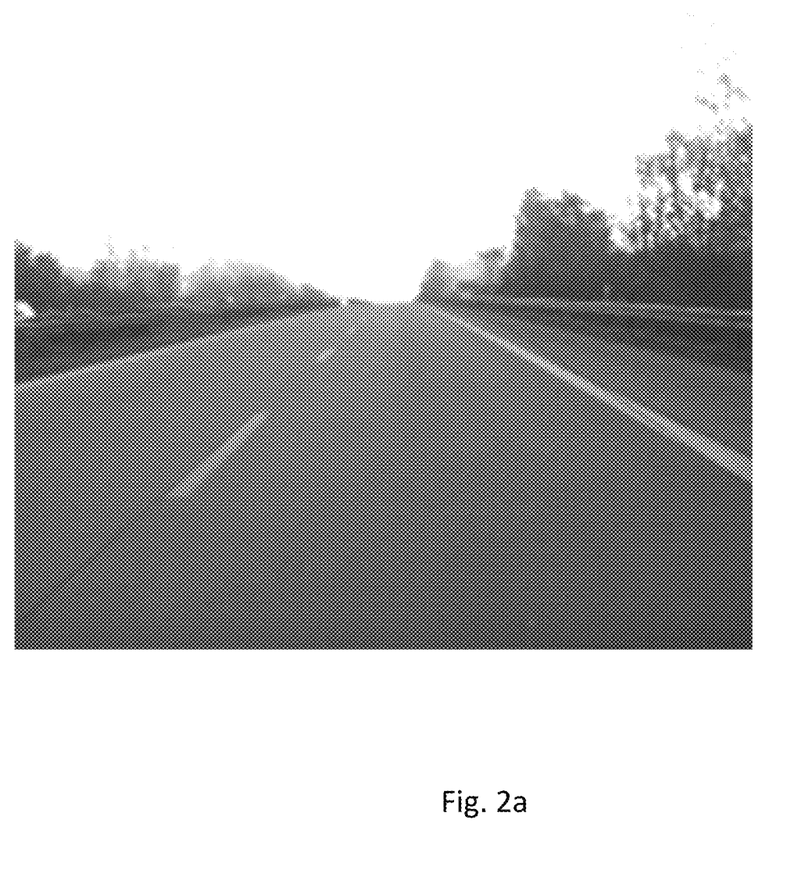
FIG. 2a is a view of a gray-scale image with a clear view.
Figure 3A:
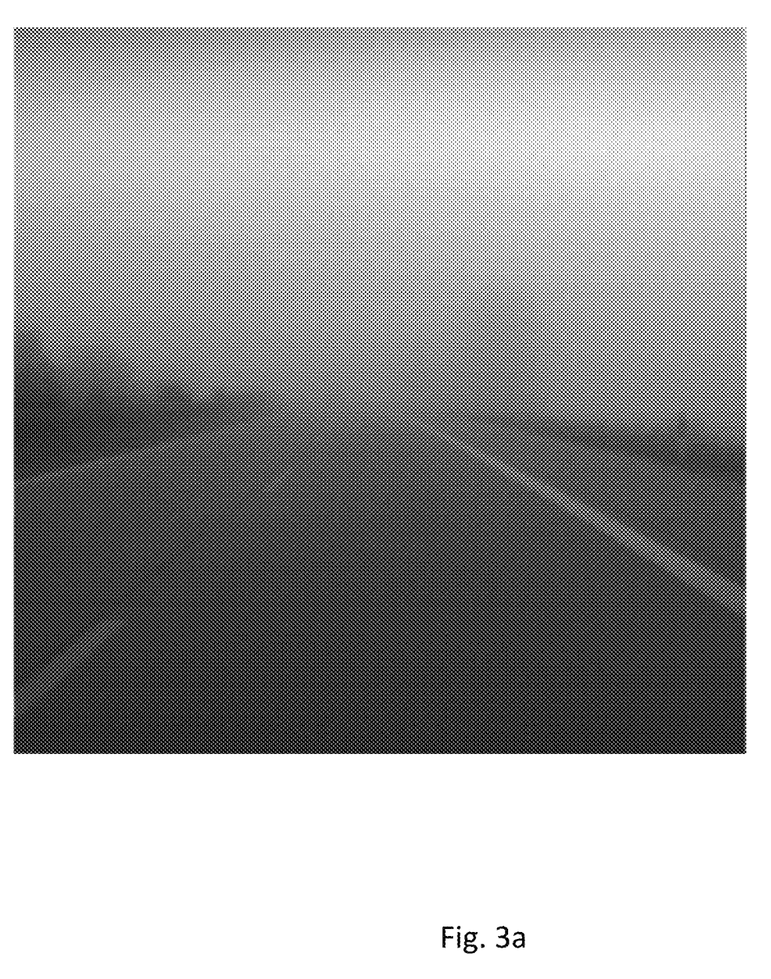
FIG. 3a is a view of a gray-scale value image with fog.

A gray-scale image is illustrated, for example, in FIG. 2a, with a clear view, i.e. under meteorological conditions with no fog, and in FIG. 3a with fog. As examples, the images in FIGS. 2a and 3a are indicated graphically. The method processes the image as a dataset, which does not necessarily have to be displayed graphically.

The gray-scale image is subjected to a further step, which is called a prefiltering or scaling. The prefiltered gray-scale image is called i'(x,y). The prefiltering consists of a local scaling of the variance of the intensity values:

$$I'(x, y) = \frac{i(x, y) * h(x, y)}{\varepsilon + \sqrt{[i(x, y) * h(x, y)]^2 * g(x, y)}}$$

wherein g(x,y) describes an isotropic Gaussian low-pass filter, and h(x,y)=I−g(x,y) describes a corresponding high-pass filter. The operator * indicates the folding operator. The numerator is a high-pass filter which frees the image of mean values. The denominator acts in a manner similar to a local estimator of the variance in the input image. The parameter $\varepsilon$ is a constant which reduces an amplification of the noise in constant image regions, such as the road or the sky. The prefiltering is used for the reduction of lighting effects and prevents the dominance of some image regions in the magnitude spectrum. The effect of the pre-filtering is potent, for example, in the case of sun radiation. In the case of sun radiation, different lighting effects occur as a result of inhomogeneous illumination, such as shading and a different gray-scale course on originally homogenous surfaces. As a result of the prefiltering, such lighting effects are compensated.

In a further step in FIG. 1, the gray-scale image is two-dimensionally fourier-transformed (FFT in FIG. 1). The fourier-transformed image, in the following also called Fourier transform, is indicated as $I(f_x,f_y)$. The two-dimensional frequency domain is specified by $f_x$ and $f_y$.

The Fourier transformation is specified as $$I(f_x, f_y) = \sum_{x,y=0}^{N-1} i(x, y) e^{-j2\pi(f_x x + f_y y)}.$$

Before the Fourier transformation, the image may optionally be multiplied by a two-dimensional window function in order to suppress broadband signal components along the coordinate axes. These occur as a result of the implicit assumption of a periodically continued signal in the case of the subsequent Fourier transformation of non-periodic signals (so-called leakage effect). The known Hanning effect, for example, can be used as the window function.

In the case of several color channels, a Fourier transform is analogously obtained for each color channel.

In a further step, the square of the absolute value $$\Gamma(f_x,f_y)$$

of the Fourier transform is formed according to $\Gamma(f_x,f_y)=\|(f_x,f_y)\|^2$ wherein $\Gamma(f_x,f_y)$ is called a power spectrum.

Figure 2B:
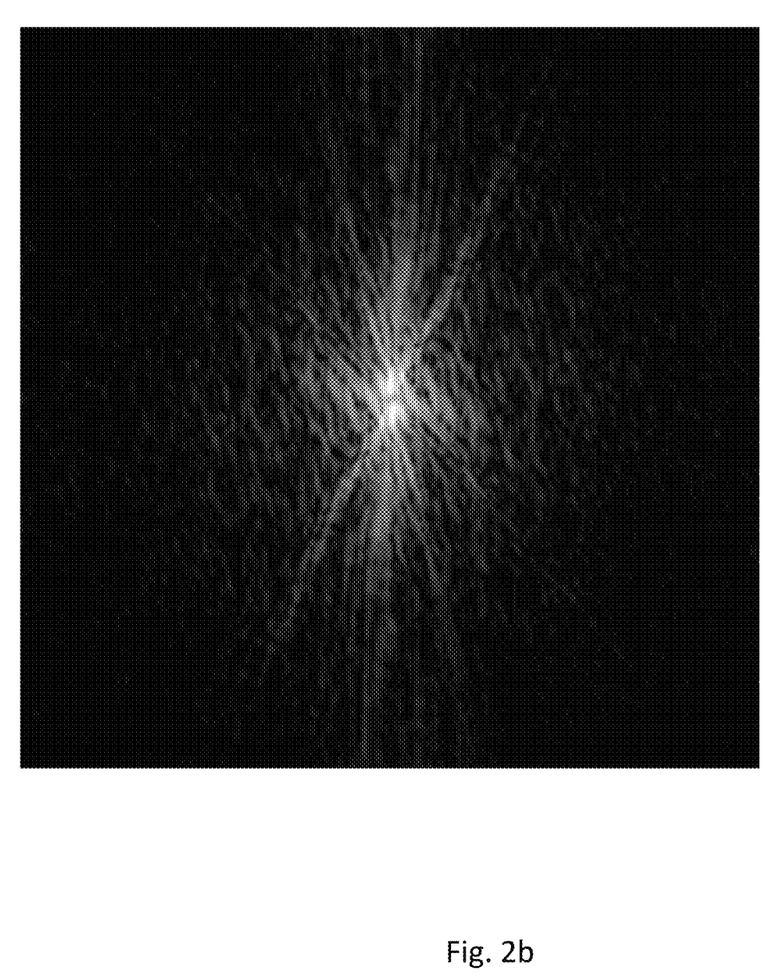
FIG. 2b is a view of the power spectrum with a clear view.
Figure 3B:
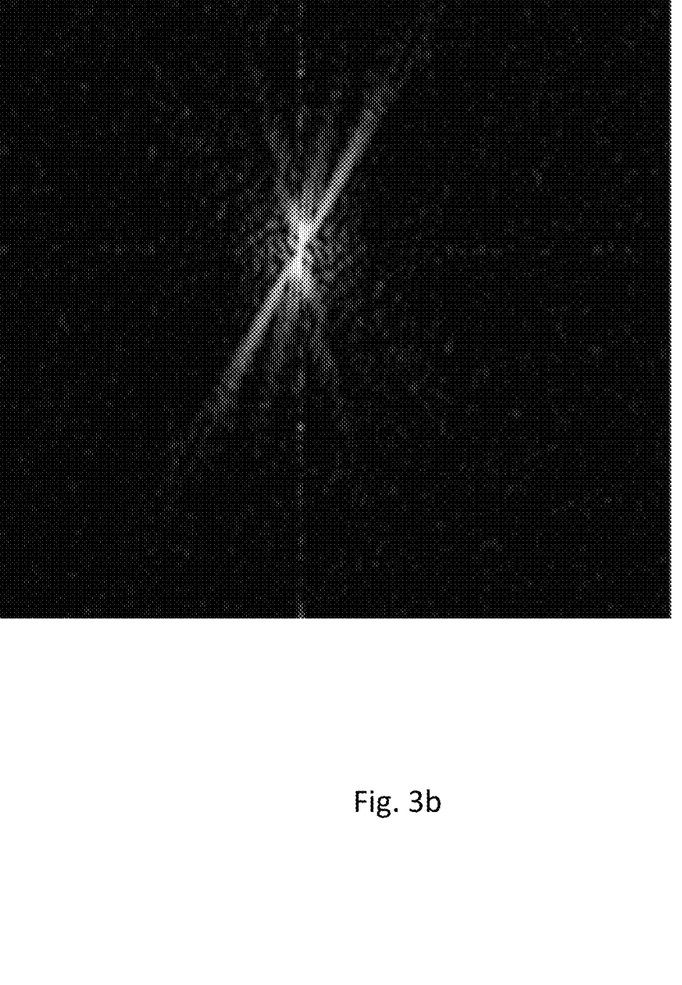
FIG. 3b is a view of the power spectrum with fog.

FIG. 2b graphically illustrates a power spectrum. The power spectrum in FIG. 2b was formed according to the described process from FIG. 2a. A corresponding situation applies to FIG. 3b, which was formed on the basis of FIG. 3a. Both representations are selected such that the zero point of the two frequency axes $f_x$ and $f_y$ is situated in the center of the image, and the individual values are imaged in a logarithmic representation. This type of representation is used exclusively for the visualization and for a plausible understanding of the process. It is easily recognizable that the spectrum in the case of fog (FIG. 3b) in the frequency domain is predominantly point-symmetrically concentrated about the center point. In contrast, when there is no fog (FIG. 2b), the spectrum clearly makes more contributions in the entire frequency domain, which can be recognized by brightness impressions also in the marginal area of the image.

The power spectrum contains information concerning the occurrence of fog and concerning the density of the fog. In this case, when the gray-value image of a scene is taken in fog, the intensity differences or gray-value gradients of adjacent points are smaller as the fog becomes denser than when a gray-value image of the same scenery is taken without fog. In the case of the image without fog, sharper edges and higher contrasts can clearly be recognized than in the case of the setting with fog. For example, a white road marking on an asphalt surfacing becomes blurry in fog, while it can be recognized in a sharply contoured manner when there is no fog.

A Fourier analysis, for example, of a one-dimensional step function, makes different contributions in the frequency domain also at high frequencies of zero which, however, disappear, for example, in the case of the Fourier analysis of a one-dimensional Gaussian distribution curve. Correspondingly, in the case of fog, the gray-scale image is limited in the two-dimensional frequency domain to lower values of the frequency parameters $f_x$ and $f_y$.

The further steps of the process according to FIG. 1 are connected with the task of modeling a power spectrum by use of digital image processing methods in order to be able to carry out a classification by way of the different form in the case of images from scenes with and without fog. For example, it is conceivable to use a linear classifier based on the linear discriminant analysis. In this case, the image characteristics of the power spectrum are subjected to a two-phase reduction of characteristics with a "scanning" by way of a Gabor filter bank and a subsequent main component analysis.

The two-step reduction of characteristics of the Fourier transform is carried out by a "scanning" of the power spectrum in the frequency domain by means of a Gabor filter bank (Gabor filter bank in FIG. 1) according to:

$$g_i = \Sigma\Sigma \Gamma(f_x,f_y) G_i(f_x,f_y), i=1 \ldots K$$

In this case, the Gabor filter bank consists of K Gabor filters, wherein a Gabor filter is constructed as $$G_i(f_x, f_y) K e^{-2\pi(\sigma_{x,i}^2(f_{x,i'}-f_r)\wedge 2+\sigma_{y,i}^2 \cdot i f_{y,i'})}$$

with $$f_{x,i'}=f_x\cos(\theta_i)+f_y\sin(\theta_i), f_{y,i'}=f_x\sin(\theta_i)+f_y\cos(\theta_i)$$

of a specific scaling ($\sigma_{x,i}, \sigma_{y,i}$) and a specific orientation $\theta_i$.

In the case of a number of, for example, K=60 Gabor filters, 60 characteristics g are obtained from the reduction of characteristics, which in the following are called Gabor characteristics. In the cases of several color channels, this analogously applies to each color channel. In the case of, for example, three color channels, 180 Gabor characteristics would therefore be obtained.

The second step of the reduction of characteristics takes place by means of an analysis of main components. For this purpose, a selection of M images is used as training data (see "training data" in FIG. 1), which are known as scenes with fog or as scenes without fog and for which the Gabor characteristics are calculated. Ideally, M/2 images are selected from scenes with fog and M/2 images are selected from scenes without fog.

First, by means of the Gabor characteristics of all these M images, the median Gabor characteristic vector is computed:

$$\Psi = \frac{1}{M}\sum_{m=1}^{M} \vec{g}_m, \vec{g} = \{g_i\}$$

Further, the covariance matrix C is calculated from the Gabor characteristic vectors $\vec{\Phi}$ freed of the median value:

$$C = \frac{1}{M}\sum_{m=1}^{M} \Phi_m \Phi_m^T = \frac{1}{M} AA^T mit A = [\Phi_1 \Phi_2 \ldots \Phi_M] \; und \; \Phi_m = \vec{g}_m - \Psi.$$

The eigenvectors of the covariance matrix are the main components. By means of the eigenvalue analysis $V^{-1}CV=D$, the diagonal matrix D contains the eigenvalues and, in the columns of the matrix $V=[\vec{v}_1 \vec{v}_2 \ldots \vec{v}_K]$ the corresponding eigenvectors. D and V can therefore be sorted such that the eigenvalues are present on the main diagonal of the diagonal matrix in descending sequence. For the reduction of characteristics, the first N,N<K eigenvectors are selected and are combined in the matrix $W=[\vec{v}_1 \vec{v}_2 \ldots \vec{v}_N]$. N can therefore be selected such that, for example, $$\frac{\sum_{l=1}^{L} D(l,l)}{\sum_{k=1}^{K} D(k,k)} > 0,95 \text{ applies.}$$

The reduced characteristic vector $\vec{\omega}$ is finally determined by way of $\vec{\omega}=W^T(\vec{g}-\vec{\Psi})$ from the original, for example, Gabor characteristic vector $\vec{g}$ and the average characteristic vector $\vec{\Psi}$. The reduced characteristic vectors of the power spectrums of the training data can therefore be used for training a classifier (see classification in FIG. 1). By means of the trained classifier, the power spectrum of the image of a scene can be categorized as a scene with fog and a scene without fog, or a scene with intermediate stages between fog and without fog.

A classifier is, for example, described as a linear classifier, based on the linear discriminant analysis: In the case of the linear classifier, by way of the scalar product of the characteristic vector $\omega$ and the weighting vector $\vec{d}$, the decision variable u can be determined $$u = \vec{d}^T \vec{\omega} = \sum_{n=1}^{N} d_n \omega_n$$

By way of the threshold value c, a class affiliation can therefore be determined (see "output" in FIG. 1) at $$c = \begin{cases} 1, u < s \\ 0, u > s \end{cases}$$

wherein 1="fog" and 0="no fog".

In this case, "1", for example, indicates an image of a scene with fog and "0" indicates a scene without fog. In addition to the binary classification, this process supplies a confidence measurement in the form of a decision variable. As the confidence measurement rises, so does the precision of the output of the classifier concerning the class affiliation. The weighting vector as well as the threshold value can be learned by use of training data (see "training data" in FIG. 1).

The "training data" step in FIG. 1 is to be understood as a special step in that the "training" of the classifier with respect to time does not take place in the course of the process (broken-line representation). The training of the classifier is used for the configuration of the classifier and, with respect to time, takes place before the application of the process, for example, during the development and implementation of the process.

The training of the weighting vector and of the threshold value may take place by means of linear discriminant analysis. In the case of the linear discriminant analysis, the weighting vector is learned by way of the covariance matrix T of the characteristic vectors and the mean characteristic vectors of images from scenes with fog and images from scenes without fog $\vec{m}_1$ and $\vec{m}_2$ with $\vec{d}=T^{-1}(\vec{m}_1-\vec{m}_2)$ and $T=E\{(\vec{\omega}-\vec{m})(\vec{\omega}-\vec{m})^T\}$.

In this case, E{ } indicates the expectation value operator and $$\vec{m} = \frac{1}{M}\sum_{m=1}^{M} \omega_m$$

indicates the mean characteristic vector of all training data. In this case, it is assumed that a sufficient quantity of training data M are present, i.e. images with fog scenes and images with fog-free scenes. Ideally, the same number of images are present for both classes. By means of the thus determined weighting vector for each class, the mean decision variable ($\bar{u}_1, \bar{u}_2$) as well as its standard deviation ($\sigma_1, \sigma_2$) can be determined, and thereby the normal distribution $N(\bar{u}_1, \sigma)$ of the decision variables of a class can be set up. The threshold value can thereby be determined by way of the point of intersection of the normal distributions $c=N(\bar{u}_1,\sigma_1) \cap N(\bar{u}_2,\sigma_2)$.

The method according to FIG. 1 can be carried out in real time. When the camera system used for taking the images delivers, for example, 15 images per second, a maximal processing time of approximately 66 ms is available per image. The steps of the method concerning a processing of data can be implemented by way of a plausible programming language, such as $C_{++}$, on a vehicle control unit. The real time of the process prevails when a sequence of steps according to FIG. 1 from the taking of the image to the output takes place within the maximal processing time.

The information output by the process can be transmitted to a driver assistance system. Optionally, an acoustic, visual or haptic warning can be emitted to the driver when fog is recognized.

Fog detection according to the described method may be advantageous for various applications in the case of driver assistance systems. Applications according to the state of the art, which use front cameras, are, for example, lane departure warning (LDW), speed limit information (SLI), or high beam assistant (FLA).

It is contemplated to draw the driver's attention to a speed limit. According to Section 3, Par. 1, of the German Road Traffic Regulations (StVO), a driver must adapt his speed to visibility conditions. According to the Road Traffic Regulations of the Federal Republic of Germany, the driver is not allowed to drive faster than 50 km/h when the visibility distance because of fog, falling snow or rain is less than 50 m. This speed limitation is not always explicitly marked in the form of traffic signs because of differences with respect to time and locality as well as infrastructure-related conditions. On the basis of these regulations and because of the fact that, according to the Federal Bureau of Statistics, many traffic accidents are the result of excessive speed, it is advantageous to remind the driver of applicable speed regulations. This could be implemented, for example, in the form of Speed Limit Information (SLI), as currently already available in the case of explicit speed limitations. So that the driver recognizes the implicit character of the speed limitation, in addition to the speed limitation, the sign referring to reduced visibility, which is customary in Germany, could additionally be displayed, for example, in the instrument cluster. Furthermore, an automatic switching on/off of the fog light or the fog taillight may be made dependent on the output of the fog detection method.

According to Section 17, Par. 3, of the German Road Traffic Regulations (StVO), fog headlights should be used only in the case of a visibility reduced by fog, falling snow or rain; the fog taillight should, in addition, be switched on only when the visibility distance is less than 50 m. However, traffic participants frequently forget to switch the fog taillight off again, which is pointed out for example, by the German Automobile Association (ADAC). As a result, traffic participants, who are following, may be blinded by the glare. When the vehicle is capable of automatically detecting dense traffic, the automatic switching-on/off of the fog headlights and of the fog taillight may be a remedy. According to the state of the art, light switching, for example, involving lower-beam light, can be found in current vehicles.

A further advantageous effect is obtained when transmitting the output to an automatic active cruise control (ACC). The automatic active cruise control is a driver assistance system which carries out a spacing-related speed control. When this system is used, the driver can set a desired speed and a spacing with respect to a target object. Although radar is mostly used as the sensor system, which is not subject to any limitations by fog, it may make sense to increase the minimally adjustable distance in dense fog.

Furthermore, the output of the method can be used for the strategy adaptation of the high-beam assistant. The high-beam assistant (FLA) is a camera-based driver assistance system which assists the driver during the switching on and off of the high beam light at night. When the system recognizes that the vehicle is situated in an insufficiently illuminated environment (for example, outside any town limits) and there is no vehicle driving ahead or oncoming, the high-beam is switched on. However, in the case of dense fog, when switching on the high-beam light, the driver will be blinded by the reflection of the light rays at the aerosols. By means of the information concerning the presence of dense fog, the strategy of the high-beam assistant can be adapted such that only high-beam light can be selected in the case of fog.

The output of the fog detection process can be used for a weather-related traffic situation detection via xFCD (Extended Floating Car Data). The abrupt transition from good visibility conditions to a very limited visibility distance because of fog represents a local danger to the driver. For increasing traffic safety, it is desirable to detect such events and warn involved traffic participants in a targeted manner. However, this is hardly reliably possible because of the dynamic character of such events, relative to their manifestation and locality, by means of stationary measuring systems. For solving this problem, the approach of xFCD for obtaining information is used. In this case, vehicles are used as mobile measuring stations. A detection of the traffic situation which, in addition to infrastructure-related data, uses xFCDs as an additional information source, supplies a more precise representation of the current weather situation. In this case, xFCD reports are centrally collected, are merged with infrastructure-related information and are output, as required, to concerned traffic participants, for example, in the form of TPEG reports. Here, vehicles with fog detection can contribute to the improvement of the detection of the weather situation with respect to the occurrence of fog.

In addition, it is advantageous to functionally connect the task of the fog detection method with further video-based systems of the vehicle, such as a rear-view backup camera system. As a result of the occurrence of fog, degradations of the acquired data quality and of the acquired information content are caused mainly in video-based systems. In the case of detected fog, image processing algorithms can be used which are adapted to fog and preprocess image information by image restoration or contrast enhancement, in order to display a more distinct image to the driver.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for detecting fog by use of a camera image or a video image, the method comprising the acts of:
    taking a two-dimensional image with at least one color channel or several color channels as a function of two independent location coordinates;
    determining a two-dimensional gray-scale function for the at least one color channel or for each of the several color channels, which defines a value of the gray scale as a function of the two independent location coordinates of the two-dimensional image;

performing a two-dimensional Fourier transformation of the two-dimensional gray-scale function depending on two independent frequency coordinates;

scaling the two-dimensional gray-scale image to compensate intensity gradients of the gray scales by use of a low-pass filter and by use of a high-pass filter;

calculating a power spectrum as the square of the absolute value of the Fourier transform;

analyzing the power spectrum by use of digital image processing;

analyzing the power spectrum by use of a family of Gabor filters;

filtering the power spectrum by each Gabor filter of the family of Gabor filters over the two-dimensional frequency range, wherein a result of said filtering is a Gabor characteristic for each of the corresponding Gabor filters; and reducing the Gabor characteristics by one of a main component analysis or a support vector method in the frequency domain to form reduced Gabor characteristics.

2. The method according to claim 1, wherein:
the Gabor characteristics or the reduced Gabor characteristics are multiplied by a predefined weighting function in order to compute a fog indicator,
the fog indicator is compared with a predefined threshold value, and
the method assigns a value for "fog" or another value for "no fog" with a confidence measurement to a classification variable.

3. The method according to claim 2, wherein:
the predefined weighting function and the predefined threshold value are predefined by an evaluation of the process by use of training data.

4. The method according to claim 1,
wherein reducing the Gabor characteristics is carried out by use of the main component analysis in the frequency domain to reduced characteristics.

5. The method according to claim 1, wherein:
the reduced characteristics are classified,
the classification is carried out by use of a linear classifier or a non-linear classifier,
the method assigns a value to a classification variable, and
a confidence measurement is assigned to the classification variable, and
the value of the classification variable scales with occurrence of fog or the density of fog with the confidence measurement.

6. A vehicle, comprising:
a control unit having a first data interface and a second data interface,
a camera- or video system coupled to the first data interface of the control unit, and
at least one driver assistance system coupled to the second data interface of the control unit, wherein the control unit is operatively configured to:
receive a two-dimensional image in real time via the first data interface from the camera or video system, with at least one color channel or several color channels as a function of two independent location coordinates;
determine a two-dimensional gray-scale function for the at least one color channel or for each of the several color channels, which defines a value of the gray scale as a function of the two independent location coordinates of the two-dimensional image;
perform a two-dimensional Fourier transformation of the two-dimensional gray-scale function depending on two independent frequency coordinates, wherein the two-dimensional gray-scale image is scaled,
the scaling compensates intensity gradients of the gray scales by use of a low-pass filter and by use of a high-pass filter,
a power spectrum, which is the square of the absolute value of the Fourier transform, is calculated,
the power spectrum is analyzed by use of digital image processing,
the power spectrum is analyzed by use of a family of Gabor filters,
the power spectrum is filtered by use of each Gabor filter of the family of Gabor filters over the two-dimensional frequency range, wherein a result of said filtering is a Gabor characteristic for a corresponding Gabor filter,
the Gabor characteristics
are reduced by a main component analysis to form reduced Gabor characteristics,
the Gabor characteristics or the reduced Gabor characteristics are multiplied by a predefined weighting function in order to compute a fog indicator,
the fog indicator is compared with a predefined threshold value,
a value for "fog" or another value for "no fog" is assigned with a confidence measurement to a classification variable, and
the value of the classification variable is transmitted to the at least one driver assistance system via the second data interface, wherein
the at least one driver assistance system is configured to at least one of output a warning to the driver in the event of occurring fog, and operate in a configuration specified for occurring fog.

7. A vehicle, comprising:
a control unit having a first data interface and a second data interface,
a camera- or video system coupled to the first data interface of the control unit, and
at least one driver assistance system coupled to the second data interface of the control unit, wherein the control unit is operatively configured to:
receive a two-dimensional image in real time via the first data interface from the camera or video system, with at least one color channel or several color channels as a function of two independent location coordinates,
determine a two-dimensional gray-scale function for the at least one color channel or for each of the several color channels, which defines a value of the gray scale as a function of the two independent location coordinates of the two-dimensional image,
perform a two-dimensional Fourier transformation of the two-dimensional gray-scale function depending on two independent frequency coordinates,
scale the two-dimensional gray-scale image,
the scaling compensates intensity gradients of the gray scales by use of a low-pass filter and by use of a high-pass filter,
calculate a power spectrum as the square of the absolute value of the Fourier transform,
analyze the power spectrum by use of digital image processing,
analyze the power spectrum by use of a family of Gabor filters,
filter the power spectrum by each Gabor filter of the family of Gabor filters over the two-dimensional frequency range, wherein a result of said filtering is a Gabor characteristic for each of the corresponding Gabor filters, and reduce the Gabor characteristics by one of a main component analysis or a support vector method in the frequency domain to form reduced Gabor characteristics.

\* \* \* \* \*